United States Patent [19]
Ritzenthaler

[11] 3,794,916
[45] Feb. 26, 1974

[54] DIGITAL VOLTMETER
[75] Inventor: Jean Ritzenthaler, Geneva, Switzerland
[73] Assignee: Hewlett-Packard Company, Palo Alto, Calif.
[22] Filed: Mar. 9, 1972
[21] Appl. No.: 233,123

[52] U.S. Cl.......... 324/99 D, 324/120, 340/347 AD
[51] Int. Cl...................... G01r 17/06, H03k 13/00
[58] Field of Search........ 324/99 D, 111, 120, 157; 340/324 R, 347 AD

[56] References Cited
UNITED STATES PATENTS

| | | | |
|---|---|---|---|
| 3,201,781 | 8/1965 | Holland | 324/120 |
| 3,482,116 | 12/1969 | James | 324/120 |
| 2,897,445 | 7/1959 | Goodale | 324/111 |
| 3,350,574 | 10/1967 | James | 324/120 |

Primary Examiner—Alfred E. Smith
Assistant Examiner—Ernest F. Karlsen
Attorney, Agent, or Firm—A. C. Smith

[57] ABSTRACT

A digital voltmeter wherein the DC voltage to be measured is converted into a linear current which in turn is converted into a proportional voltage used to drive a voltage tunable oscillator producing an output pulse train with a repetition rate proportional to the input voltage, a digital counter system being utilized to count the pulses and record the count on a digital display. In one embodiment, the voltmeter measures positive input voltages in voltage increments producing 1 Hz pulse rate changes over a range of 1,000 Hz. In a second embodiment the voltmeter measures both positive and negative incoming voltages, with means for indicating to the operator the sign of the measured voltage.

3 Claims, 3 Drawing Figures

DIGITAL VOLTMETER

BACKGROUND OF THE INVENTION

The voltage-to-time conversion techniques used today in digital voltmeters can be divided into two groups. The first group uses a voltage ramp starting from a known level and moving until coincidence with the voltage measured. If the slope of the ramp is constant, the time elapsed between the subject coincidence and a ground or zero level is proportional to the voltage measured. The elapsed time can be measured with a train of pulses which are counted for digital display, the count being proportional to the voltage level of the measured voltage.

The ramp may also move in steps, i.e., a staircase ramp where each step has a well defined level. At coincidence of the staircase ramp with the voltage to be measured, the number of steps of the ramp is a direct measure of the voltage and can be used for digital display.

The second ground of digital voltmeters uses potentiometric and/or integrating techniques. The voltage to be measured is counter-balanced in a comparator system either by a train of pulses with calibrated voltage time surface or by voltage source arranged preferably in BCD steps. For example, the voltage to be measured is counter-balanced with voltage sources which are switched in steps until a detector detects balance of the voltages. For a resolution of one thousandth, thirteen voltage sources are needed in BCD coding.

It is apparent that all these techniques need extensive circuitry. Further, none can convert voltages of different polarities. If positive and negative voltages are to be measured, a polarity detector is included in the circuitry followed by a voltage inverter. Also, many of these systems are more or less sensitive to superimposed noise on the voltage to be measured.

SUMMARY OF THE PRESENT INVENTION

The present invention provides a simple and inexpensive yet relatively accurate digital voltmeter wherein a voltage tunable oscillator is utilized as an analog-to-digital converter to convert an incoming voltage signal to a digital output for display on a digital readout.

The novel digital voltmeter comprises a current source for converting the incoming DC voltage into a current with an amplitude proportional to the input voltage, means for converting this current into a voltage proportional thereto, and a voltage tunable oscillator stage for producing a variable frequency output in the form of a chain of pulses with a repetition rate proportional to said latter voltage. A binary counter system is then employed to count the pulses and to register this count on a digital display as a value in volts.

In one embodiment, each +10 mV of incoming voltage produces a 1 Hz increase in a VTO, the pulse output of the VTO ranging from 1,000 Hz at zero volts to 2,000 Hz at 10 volts, this pulse output being counted in a binary counter system and thereafter registered on a digital display. Provision is made for converting the 2 thousandths digit developed at 2,000 Hz to a 1 for display as 10.00 volts.

In a second embodiment, the voltmeter is adapted to measure both positive and negative incoming DC voltages, with the VTO pulse output increasing from a predetermined pulse rate with increasing positive voltages and decreasing from said predetermined pulse rate with increasing negative voltages. Means are provided for converting the decreasing pulse rate to an increasing digit count, and for providing a signal to indicate the positive or negative potential of the incoming voltage.

DESCRIPTION OF THE PREFERRED EMBODIMENTS

Figure 1:
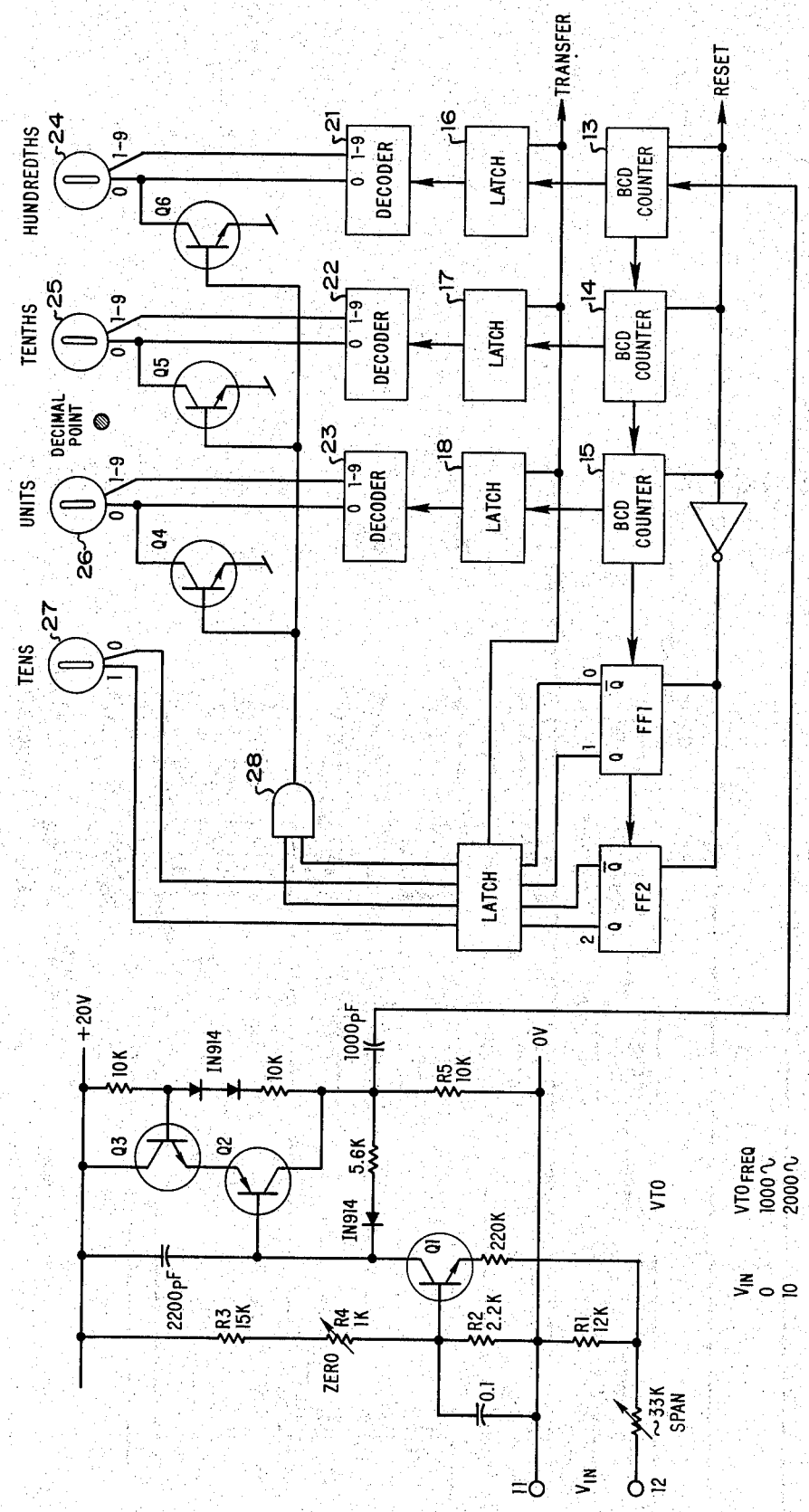
FIG. 1 is a schematic diagram of one form of digital voltmeter designed to measure positive voltages in the range from 0 to 10 volts.

Referring now to FIG. 1, the incoming voltage being measured is applied across the resistor R1 in the emitter circuit of the constant current source transistor Q1, the biasing circuit comprising resistors R2 and R3 and the potentimeter R4 providing a bias to the base of Q1. The current flowing in the collector circuit of Q1 is a linear function of the input voltage applied across the input terminals 11 and 12 and serves to charge the capacitor C1 in the multivibrator circuit which includes transistors Q2 and Q3.

When C1 reaches a predetermined level of charge, transistors Q2 and Q3 go into conduction, causing C1 to discharge and producing a sharp positive pulse at R5. Capacitor C1 will then commence once again to charge up to the predetermined value at which time Q2 and Q3 will again operate to discharge C1 and produce a second sharp pulse. Thus, a series of sharp pulses will be generated, and the repetition rate of these pulses will be dependent on the length of time it takes C1 to charge up to the predetermined voltage level. Since this charge up time is proportional to the current flow from the current source Q1, whice in turn is linearly related to the voltage input, the pulse rate is proportional to the input voltage.

With an input voltage set at zero, the resistance of the potentiometer R4 is adjusted to give an idling current from Q1 to set the output pulse rate at 1,000 pulses per second. In the circuit illustrated, each +10 mV step in the incoming voltage will produce an increase in the pulse rate of 1 Hz to give an increase of 1,000 Hz and thus a total pulse rate of 2,000 Hz for a 10 volt input.

The generated pulses are transmitted to a binary counter system including three BCD stages 13, 14 and 15, each stage being coupled through associated conventional latch circuits 16, 17 and 18 and decoders 21, 22 and 23, respectively, to associated digital display devices 24, 25 and 26, respectively, such as Nixie tubes.

Since at zero volts input, the output pulse rate is set at 1,000 Hz, provision is made to change the tens display 27, which would normally be a one to give a reading of 10.00 volts, to a zero. This is accomplished by the flip-flop circuit FF1 which operates on an input from counter 15 on receipt of the 1,000 pulse count to give a high Q output, turning the zero digit of the tens display 27 on. The Q output of flip-flop FF2 is low, and the one digit in the tens display is off.

As the input voltage rises, the digital display increases one digit for each pulse, i.e., for each 10 mV, so that for 9.99 volts, the digital display reads 09.99.

When the input voltage reaches 10.00 volts, the 2,000 pulse count received by counter 15 produces a second input to FF1 which operates to place a low on Q to extinguish the zero on the tens display. Flip-flop FF2 operates to place a high on its Q output to turn on the 1 digit in the tens display, to thereby present a 10.00 display.

The circuit is designed to operate over a suitable time period for counting, such as 1 second, so that the counters will transfer their count once each second to the storage and display, and will be reset in about 1 microsecond to commence the next count.

If the zero setting is incorrectly set so that the pulse output of the VTO is below 1,000 Hz, for example 999 Hz, the counter would display a high voltage reading, in this illustration 9.99. However, when the count is below 1,000, the $\bar{Q}$ outputs of both FF1 and FF2 are high, and the AND gate 28 operates to turn on the three transistors Q4, Q5 and Q6 to light the zero digits in the units, tenths and hundredths display tubes as well as the ordinarily lighted digits. This overlapping digit lighting signifies to the operator that the zero setting is incorrect.

Figure 2A:
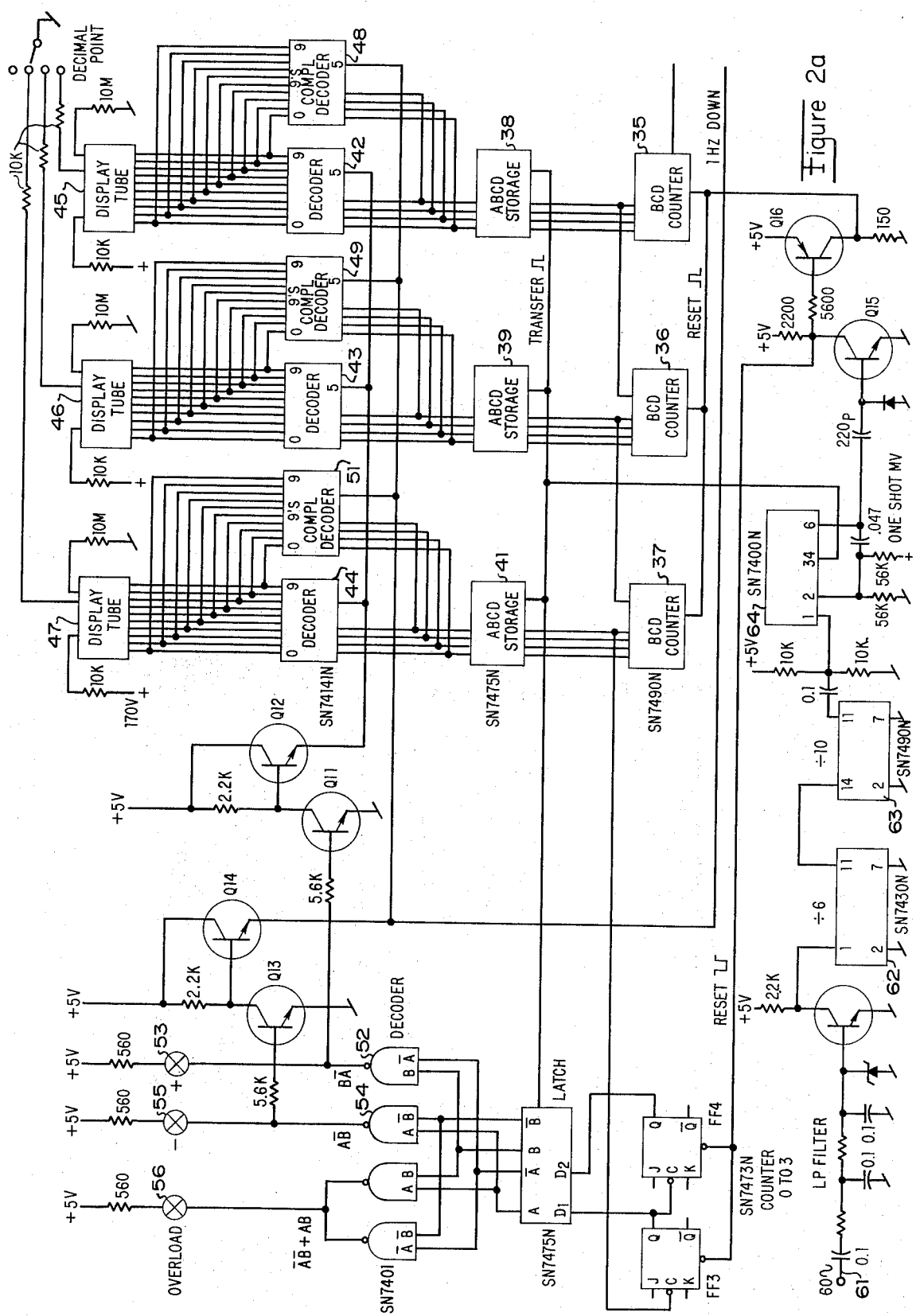
FIG. 2 is a schematic diagram of another embodiment of the invention designed to measure both positive and negative voltages.
Figure 2B:
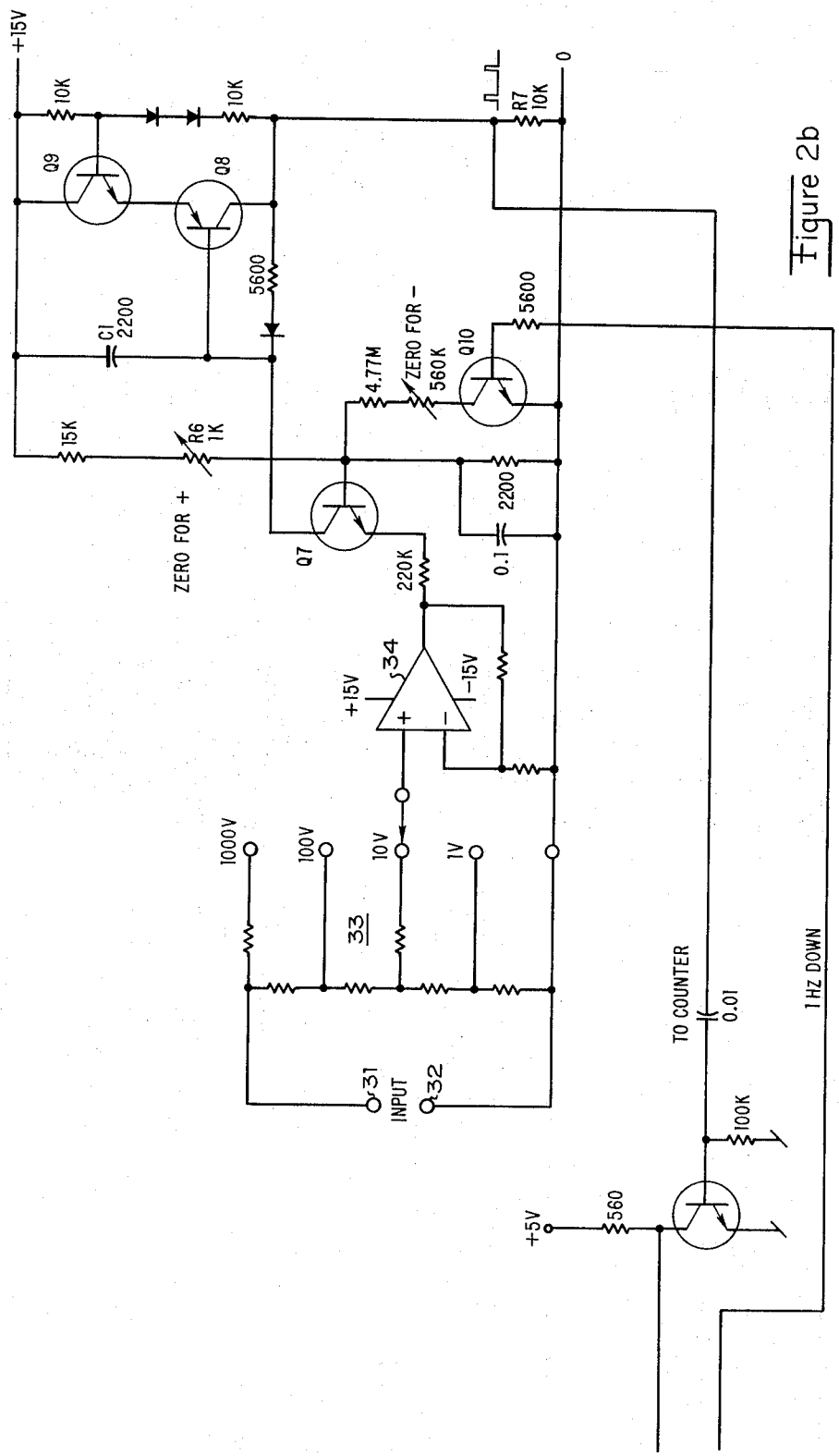

Referring to FIG. 2, the input voltage coupled to the input terminals 31 and 32 is transmitted to the current source Q7 via a range selection attenuator circuit 33 and an impedance converter 34 which matches the low impedance of the current source circuit to the generally high impedance of the measured circuit. The idling current of the current source Q7 transmitted to capacitor C1 is set by potentiometer R6 to produce a pulse output at R7 from the multivibrator circuit Q8, Q9 of 2,000 Hz at zero input voltage, these pulses being delivered via Q11' to the standard form of BCD counters 35, 36 and 37. The count registered therein is transferred by standard counter techniques via storage stages 38, 39 and 41 and decimal decoders 42, 43 and 44 to the associated three display tubes 45, 46 and 47, respectively.

In this embodiment, there is no thousandths digit display tube, so that the display will show 0.00 but not 20.00; therefore at the idling current pulse rate of 2,000 at zero input volts, the display reads 0.00. For each +10 mV step at the input, the pulse rate output increases by 1 hz to reach 2,999 Hz for a 9.99 v input at which time the display reads 9.99. At the next +10 mV step, the pulse rate is 3,000 and the display shows 0.00.

When the input voltage goes negative, Q10 starts to conduct and reduces the idling current of Q7 so that the pulse repetition rate is decreased by 1 Hz for each −10 mV at the input; a −10V input will result in a pulse rate of 999 Hz. Three 9's complement decoders 48, 49 and 51 are employed to cause the display tubes to count up one digit for each decrease of 10mV in the input voltage.

The display logic for this embodiment is shown in the following table:

| Input voltage (V) | Osc freq. (Hz) | 9's complement | Sign | Display |
|---|---|---|---|---|
| +10.00 | 3 000 | ...... | Overload | 0.00 |
| +9.99 | 2 999 | ...... | + | 9.99 |
| +5.00 | 2 500 | ...... | + | 5.00 |
| +1.01 | 2 101 | ...... | + | 1.01 |
| +0.50 | 2 050 | ...... | + | 0.50 |
| +0.10 | 2 010 | ...... | + | .10 |
| +0.05 | 2 005 | ...... | + | .05 |
| +0.01 | 2 001 | ...... | + | .01 |

Table – Continued

| Input voltage (V) | Osc freq. (Hz) | 9's complement | Sign | Display |
|---|---|---|---|---|
| +0.00 | 2 000 | ...... | + | .00 |
| −0.00 | *1 999 | 000 | − | .00 |
| −0.01 | 1 998 | 001 | − | .01 |
| −0.05 | 1 994 | 005 | − | .05 |
| −0.10 | 1 989 | 010 | − | .10 |
| −0.50 | 1 949 | 050 | − | .50 |
| −1.01 | 1 898 | 101 | − | 1.01 |
| −5.00 | 1 499 | 500 | − | 5.00 |
| −9.99 | 1 000 | 999 | − | 9.99 |
| −10.00 | 0 999 | 000 | Overload | 0.00 |

* When the input voltage is going negative the oscillator is stepped down by one Hz.

A special decoder circuit is employed to inform the operator when the instrument is measuring positive voltages, negative voltages, and the overload condition, i.e., +10.00 v or −10.00 v or greater. When the input voltage is zero or going in a positive direction, the pulse rate is 2,000 Hz or higher, and the thousandths digit is a 2 which serves to operate the flip-flop circuit FF3 to produce a low on its Q output ($\bar{A}$). At this time, a high appears on the Q output (B) of flip-flop FF4, and the logic formula B$\bar{A}$ is true and NAND gate 52 operates to turn on the signal light 53 signifying "positive." Transistor Q11 goes off and Q12 goes on and couples the +5 volt supply voltage to the three decimal decoders 42–44 so that the three display tubes 45–47 will count up as the pulse rate increases from 2,000 to 2,999 Hz.

When the pulse rate drops below 2,000 Hz during a negative input voltage measurement, the thousandths digit is a 1 and flip-flops FF3 and FF4 operate to make the formula A$\bar{B}$ true. The NAND gate 54 operates to light the "negative" signal lamp 55 and Q13 goes off while Q14 goes on to couple the +5 supply volts to the 9's complement decoders 48–51. The display tubes will now be counted up 1 digit per pulse as the pulse rate decreases from 2,000 Hz to 1,000 Hz.

Should the pulse rate go below 1,000 Hz or above 2,999 Hz corresponding to an input voltage of −9.99 v or +9.99 v, respectively, (on the 10 v input range) the special decoder circuit operates to make $\bar{A}\bar{B}$ + AB true, and the "overload" lamp 56 goes on to tell the operator of this condition. On this condition, both Q12 and Q14 are off and the +5 is disconnected from both the decimal decoders and the 9's complement decoders so that the display goes blank.

A simple circuit for establishing the counting period of 1 second is shown operating from a 60 Hz supply line 61. The 60 Hz signal is first divided by 6 by circuit 62 and the output then divided by 10 in circuit 63 to give a one cycle per second input to the one shot multivibrator 64 which operates to provide the standard reset signals via Q15 and Q16 to the special decoder circuitry and to the BCD counters once each second.

It is noted that the counter has no gate; it counts the pulses over a 1 second period, resets within 1 microsecond, and counts again. The shortest period to be measured is 0.33 milliseconds at 3,000 Hz and therefore the one microsecond reset time will not suppress any count.

This novel device measures both positive and negative voltages with no switching in the analog circuit. As with the circuit of FIG. 1, noise is integrated and eliminated in the VTO to digital conversion and therefore both of the devices of FIG. 1 and FIG. 2 are simple and inexpensive yet accurate for this class instrument.

I claim:
1. A signal measuring apparatus comprising:
pair of input terminals;
first means for converting a unidirectional input signal to a current value which varies above a non-zero idling current value in proportion to the magnitude of the unidirectional input signal, said non-zero idling current value corresponding to a zero value unidirectional input signal;
second means coupled to the first means and responsive to said current value for producing a series of pulses having a pulse rate which is proportional to said current value, said second means also having a reference pulse rate in response to the non-zero idling current value;
counter means coupled to the second means for counting the series of pulses in accordance with a selected radix to provide a counter output having a non-zero most significant digit manifestation and zeroes for lesser significant digit manifestations in response to the non-zero idling current value;
display means coupled to the counter means and being responsive to said counter output for displaying only said lesser significant digit manifestations thereof representing the unidirectional input signal, said display means displaying the zero digits of the reference pulse rate count in response to a zero value unidirectional input signal.

2. Signal measuring apparatus as in claim 1 wherein the first means includes a current source responsive to the unidirectional input signal, said current source varies the current output in proportion to the magnitude of the unidirectional input signal for increasing or decreasing the pulse rate linearly from the reference pulse rate.

3. A signal measuring apparatus as in claim 2 wherein the counte means includes:
counters coupled to the display means;
first logic means coupled between the display means and the counters for registering a digital count on the display means for either an increasing or a decreasing pulse rate from the reference pulse rate, said first logic means includes a 9's complement circuit coupled between the counters and the display means for registering an increasing count from the decreasing pulse rate of a negative unidirectional input signal; and
second logic means coupled to the display means for indicating the polarity of the unidirectional input signal and a condition of overloading where the magnitude of the unidirectional input signal exceeds the measurable signal range of said signal measuring apparatus.

* * * * *